US006964460B2

(12) United States Patent
O'Dea

(10) Patent No.: US 6,964,460 B2
(45) Date of Patent: Nov. 15, 2005

(54) BRAKE CONTROLLER AND METHOD FOR CONTROLLING A BRAKE SYSTEM

(75) Inventor: Kevin A. O'Dea, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/726,428

(22) Filed: Dec. 3, 2003

(65) Prior Publication Data

US 2005/0121976 A1    Jun. 9, 2005

(51) Int. Cl.[7] .............................................. B60T 8/00
(52) U.S. Cl. ..................... 303/139; 701/72; 303/140; 303/189
(58) Field of Search ................. 303/140–148, 303/149, 147, 157, 163, 176, 139; 701/72, 701/71, 73, 80, 78, 81, 83; 180/197

(56) References Cited

U.S. PATENT DOCUMENTS

| | | | | |
|---|---|---|---|---|
| 3,918,766 | A | * | 11/1975 | Klatt .......................... 303/189 |
| 4,844,557 | A | * | 7/1989 | Giers .......................... 303/140 |
| 4,961,476 | A | | 10/1990 | Witte et al. |
| 5,415,469 | A | | 5/1995 | Poggenburg et al. |
| 5,720,533 | A | | 2/1998 | Pastor et al. |
| 5,746,486 | A | | 5/1998 | Paul et al. |
| 5,774,821 | A | * | 6/1998 | Eckert ......................... 701/78 |
| 5,944,393 | A | | 8/1999 | Sano |
| 6,012,010 | A | * | 1/2000 | Batistic et al. ................. 701/72 |
| 6,026,343 | A | * | 2/2000 | Ogino .......................... 701/72 |
| 6,027,183 | A | * | 2/2000 | Katayose et al. ............. 303/146 |
| 6,089,680 | A | * | 7/2000 | Yoshioka et al. ............ 303/146 |
| 6,272,419 | B1 | | 8/2001 | Delplace et al. |
| 6,273,529 | B1 | | 8/2001 | Woywod et al. |
| 6,438,483 | B1 | | 8/2002 | Loudon et al. |
| 6,466,857 | B1 | | 10/2002 | Belvo |
| 6,512,973 | B2 | | 1/2003 | O'Dea et al. |
| 6,523,914 | B2 | * | 2/2003 | Poggenburg et al. ....... 303/146 |
| 6,588,859 | B2 | | 7/2003 | Loudon et al. |
| 6,591,179 | B1 | | 7/2003 | Check et al. |
| 6,591,937 | B2 | | 7/2003 | Badenoch et al. |

FOREIGN PATENT DOCUMENTS

| | | | |
|---|---|---|---|
| FR | 2818219 | | 6/2002 |
| JP | 6-64515 | * | 3/1994 |

* cited by examiner

Primary Examiner—Douglas C. Butler
(74) Attorney, Agent, or Firm—Michael D. Smith

(57) ABSTRACT

A control system for controlling a brake system of a braked vehicle during a turn, the vehicle having four wheels. The control system is configured to selectively modify a brake pressure applied to each of the wheels by the brake system. The control system is configured to receive a driver input relating to a brake pressure sought to be applied. The control system includes a controller for monitoring a slip status of each of the four wheels during a turn. The controller is configured to direct the brake system to independently increase, decrease, or hold the brake pressure applied to each of the four wheels based at least in part upon slip status of each respective wheel. The controller is configured to direct the brake system to modify the brake pressure applied to each of the wheels such that the brake pressure applied to a given wheel of the four wheels is always equal to or less than the brake pressure sought to be applied.

38 Claims, 3 Drawing Sheets

BRAKE CONTROLLER AND METHOD FOR CONTROLLING A BRAKE SYSTEM

The present invention is directed to a braking controller and method for controlling brakes, and more particularly, to a braking controller and method for controlling brakes of a vehicle during cornering.

BACKGROUND

Brake control while a vehicle is turning or cornering presents unique challenges. In particular, due to the angular velocity, lateral acceleration and speed differential between inner and outer wheels of the vehicle, controlled braking during a turn provides additional complexities as compared to straight-line braking. Existing braking-while-cornering systems may analyze the speed differential between diagonally-oriented (i.e. inner and outer) wheels and across axles. However, such systems do not analyze the status of each of the four wheels of a vehicle, and do not analyze the slip status of the wheels which can be used to determine the stability of the vehicle. Accordingly, there is a need for a braking controller and a method for controlling a brake system which can analyze the status of each of the four wheels and which can consider the slip status of the wheels.

SUMMARY

In one embodiment, the present invention is a braking controller and a method for controlling a brake system which can analyze the status of each of the four wheels and which can consider the slip status of the wheels. In particular, in one embodiment the invention is a control system for controlling a brake system of a vehicle during a turn, the vehicle having four wheels. The brake system is configured to selectively control brake pressure to each of the wheels and includes a controller for monitoring a slip status of each of the four wheels during a turn. The controller is configured to direct the brake system to independently increase, decrease, or hold the brake pressure applied to each of the four wheels based at least in part upon slip status of each respective wheel.

In another embodiment the invention is a control system for controlling a brake system of a vehicle during a turn, the vehicle having a plurality of wheels. The brake system is configured to selectively control brake pressure to each of the wheels, and includes a controller for determining a corrective differential velocity which represents a velocity differential between at least one wheel on one side of the vehicle and at least another wheel on another side of the vehicle that is desired to maintain the desired heading of the vehicle. The controller is configured to direct the brake system to increase, decrease, or hold the brake pressure applied to each of the wheels based at least in part upon the corrective differential velocity.

Other objects and advantages of the present invention will be apparent from the following description and the accompanying drawings.

DETAILED DESCRIPTION

Figure 1:
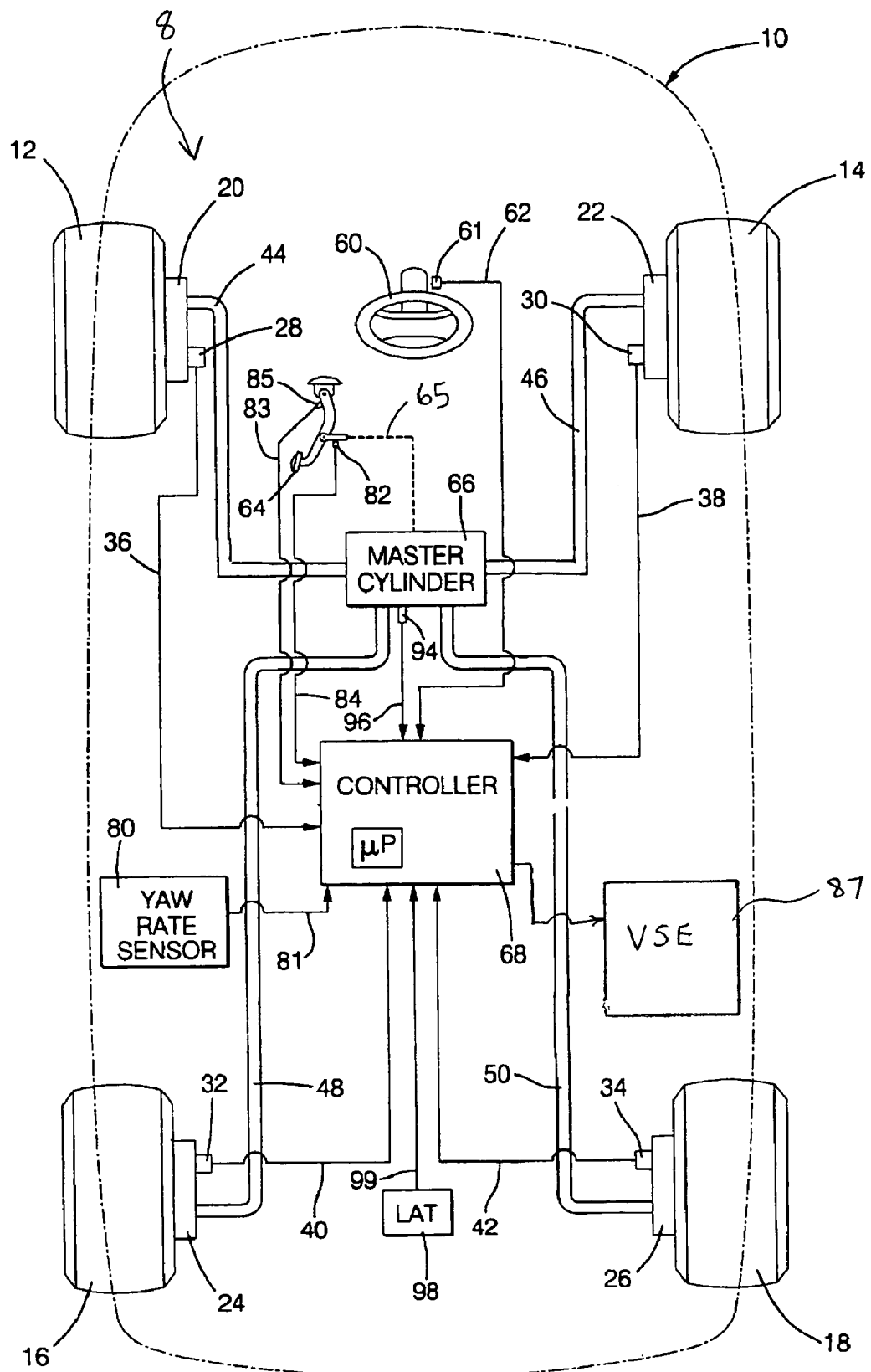
FIG. 1 is a top schematic representation of a vehicle including the system or method of the present invention.

The present invention may be a brake system 8 which may include or be utilized in a vehicle such as the vehicle 10 schematically shown in FIG. 1. The vehicle 10 may include a set of four wheels 12, 14, 16 and 18, with each wheel 12, 14, 16, 18 having an associated brake or brake subsystem 20, 22, 24, 26. Each brake 20, 22, 24, 26 may be a hydraulically operated brake that is coupled to a hydraulic control unit or master cylinder 66 by an associated control line 44, 46, 48, 50. The master cylinder 66 may have a sensor 94 that is operatively coupled to a controller, such as an electronic control unit 68, via signal line 96. The brake system 8 may include wheel speed sensors 28, 30, 32, 34 that can monitor the rotational speed of each of the wheels 12, 14, 16, 18. The wheel speed sensors 28, 30, 32 and 34 may be operatively coupled to the controller 68 via connection lines 36, 38, 40, 42, respectively.

The brake system 8 may further include a brake pedal 64 and a brake pedal switch 82 which can determine the position of the brake pedal 64. The brake pedal switch 82 is operatively coupled to the controller 68 via signal line 84 to so that the brake pedal switch 82 can send signals indicative of the position of the brake pedal 64 to the controller 68. The brake pedal 64 may also be directly (i.e. hydraulically, mechanically, electronically or otherwise) coupled to the master cylinder 66, as indicated by the dotted line connection 65 to control the pressure in the master cylinder 66 and in the brake subsystems 20, 22, 24, 26. The brake system 8 may optionally include a brake pedal extended travel sensor 85 which can send a signal to the controller 86 via signal line 83 upon extended travel of the brake pedal 64. The brake pedal extended travel sensor 85 may be a switch that provides an output signal when the pedal 64 has been depressed an extended amount indicating "hard" braking by the driver.

The vehicle 10 includes a steering wheel 60 and a steering wheel sensor 61 to track the rotational position or angle of the steering wheel 60 and send a signal indicative of the rotational position of the steering wheel 60 to the controller 68 via signal line 62. In one example, the steering wheel position sensor 61 may be a digital sensor that provides output signals that increment a digital position signal within controller 68 with each degree or partial degree of rotation of the steering wheel 60 in one direction and decrement the digital position signal with each degree or partial degree of rotation in the opposite direction. The steering wheel sensor 61 may also be an analog sensor that provides an analog sensor position output (i.e., from a rotary resistive device of a known type).

The vehicle 10 may include a yaw rate sensor 80 which can send signals indicative of the yaw rate of the vehicle 10 to the controller 68 via signal line 81. The vehicle 10 may include the master cylinder pressure sensor 94 which can send signal indicative of the pressure of the master cylinder 66 to the controller 68 via signal line 96. The vehicle 10 may include a lateral accelerometer 98 that can send a signal to the controller 68 that is indicative of the lateral acceleration of the vehicle 10 via signal line 99. Various other sensors that provide information relating to the stability, speed or velocity of the vehicle, road and ambient conditions or driver requested headings and the like may also be utilized but are not specifically illustrated herein.

The controller 86 may include or be coupled to a vehicle stability enhancement system (VSE) 87, also referred to as an electronic stability program (ESP), which may be an electromechanical control system designed to monitor and influence wheel dynamics, and ultimately vehicle dynamics during a vehicle state of braking, accelerating or coasting. VSE 87 typically uses input from the brake sensors 28, 30, 32, 34, the steering wheel angle sensor 61, the yaw rate sensor (or vehicle rotation rate sensor) 80 and the lateral acceleration sensor (or lateral accelerometer) 98 to determining the driver's intended heading and the vehicle's actual heading. In other words, VSE 87 may be designed to identify the intent of a driver by measuring the steering wheel angle, brake and throttle positions and vehicle speed. VSE 87 typically may control the application of the wheel brakes 20, 22, 24, 26, as necessary, to help a driver regain control in a skid caused by oversteering or understeering during a turn. However, the present invention does not rely upon the VSE 87 to provide any control of brakes, but instead may utilize the VSE 87 merely to provide processed information and data to the system/method of the present invention. The microcontroller functions for the VSE 87 may be contained in controller 68, in which case the VSE 87 need not necessarily be viewed as a separate component from the controller 68.

As part of its calculations the VSE may determine a Delta Velocity Left Right ("DVLR") term or value. During a turn, the velocity differential between the inside wheels and the outside wheels may be monitored. DVLR represents a velocity adjustment calculated by the VSE that is required/recommended in order to ensure that the vehicle travels in the heading desired by the user. For example, in left turn in an oversteer condition, the VSE may calculate a DVLR value that requires braking of the outside (right) wheels. If the vehicle 10 is in neither an oversteer or an understeer condition (that is, the vehicle is heading where the driver desires) then the DVLR value may be zero. Various methods for determining DVLR may be utilized such as those disclosed in U.S. Pat. No. 5,720,533 and U.S. Pat. No. 5,746,486, the contents of which are hereby incorporated by reference.

DVLR may be visualized, in a simple manner, as a table or tables (typically represented in a speed such as kilometers per hour or miles per hour) that provides a value for DVLR based upon various inputs such as the speed of the vehicle, the heading desired by the driver (i.e. as determined by the steering sensor 61) and the yaw rate (as determined by the yaw rate sensor 80), and/or lateral acceleration (as determined by the accelerometer 98). The sign of DVLR may be positive or negative, depending upon the direction of turn of the vehicle and the type of velocity differential required between the left and right wheels.

The present invention performs an active brake monitoring/control of the brakes 20, 22, 24, 26 responsive to the slip status of each wheel 12, 14, 16, 18 and the instability of the vehicle 10 (or the effects proposed action will have upon instability of the vehicle 10). For a given wheel, a series of calculations are carried out in a series of closed loops to determine the slip value for that wheel. These calculations may be carried out in a processor, hardware, software, ROM, RAM or the like in the controller 68, VSE 87 or elsewhere in the system when the vehicle is in a turn and the brakes are being applied.

For example, steps which may be used to calculate the slip value for a wheel under consideration are provided below. As a first step, a Yaw Velocity Compensation is calculated as follows:

$$\text{Yaw Velocity Compensation} = \text{track} * \text{yaw rate} \quad \text{(Eq. 1)}$$

where "track" represents the width of the vehicle 10 and yaw rate represents the yaw rate of the vehicle as provided, for example, from the yaw rate sensor 80. In order to get a "true" value of the velocity contributed by the yaw of the vehicle 10 at the wheel under consideration, the right side of Equation 1 should be multiplied by ½. However, as will be seen below this ½ factor may be incorporated in subsequent calculations.

Next, a DVLR value is obtained from, for example, the VSE 87. An adjusted vehicle speed is then calculated as follows:

$$\text{Adjusted Vehicle Speed} = \text{Vehicle Speed} + DVLR - (\text{Yaw Velocity Compensation} * k1) \quad \text{(Eq. 2)}$$

where Vehicle Speed represents the linear speed of the vehicle 10 at its center of gravity and k1 is a constant. The linear speed of the vehicle 10 at its center of gravity may be determined in a variety of manners well known to one of ordinary skill in the art, including taking an average of the wheel speed sensors 28, 30, 32, 34 or other calculation methods. The DVLR value may be included in Equation 2 because the value represented by DVLR may be desired to be included in subsequent slip calculations. However, if desired DVLR may be omitted from Equation 1. As its nominal value, k1 may be set to ½ to accommodate the ½ factor discussed above in the context of Equation 1 above. However, the value for k1 may be adjusted as desired to increase or decrease the effect of the yaw of the vehicle upon the Adjusted Vehicle Speed. Adjusted Vehicle Speed generally represents the speed of the vehicle at the wheel that is being examined, but the Adjusted Vehicle Speed may also consider the DVLR value.

Next, the slip of the wheel under examination is determined. The slip may be calculated as follows:

$$\text{Slip} = (\text{Adjusted Vehicle Speed} - \text{Wheel Speed}) / \text{Adjusted Vehicle Speed} \quad \text{(Eq. 3)}$$

where Wheel Speed is the speed of the wheel under examination as provided by the associated wheel speed sensor 28, 30, 32, 34. Thus the slip of a wheel provides an indication of the slipping or skidding of the wheel, and is indicative of whether intervention is required. For example, a slip value of 0 (0%) indicates no skidding of the wheel; a slip value of 1 (i.e. 100%) indicates complete skidding or a "lock-up" of the wheel; a slip value of 0.1 (i.e. 10%) indicates significant braking.

Figure 2:
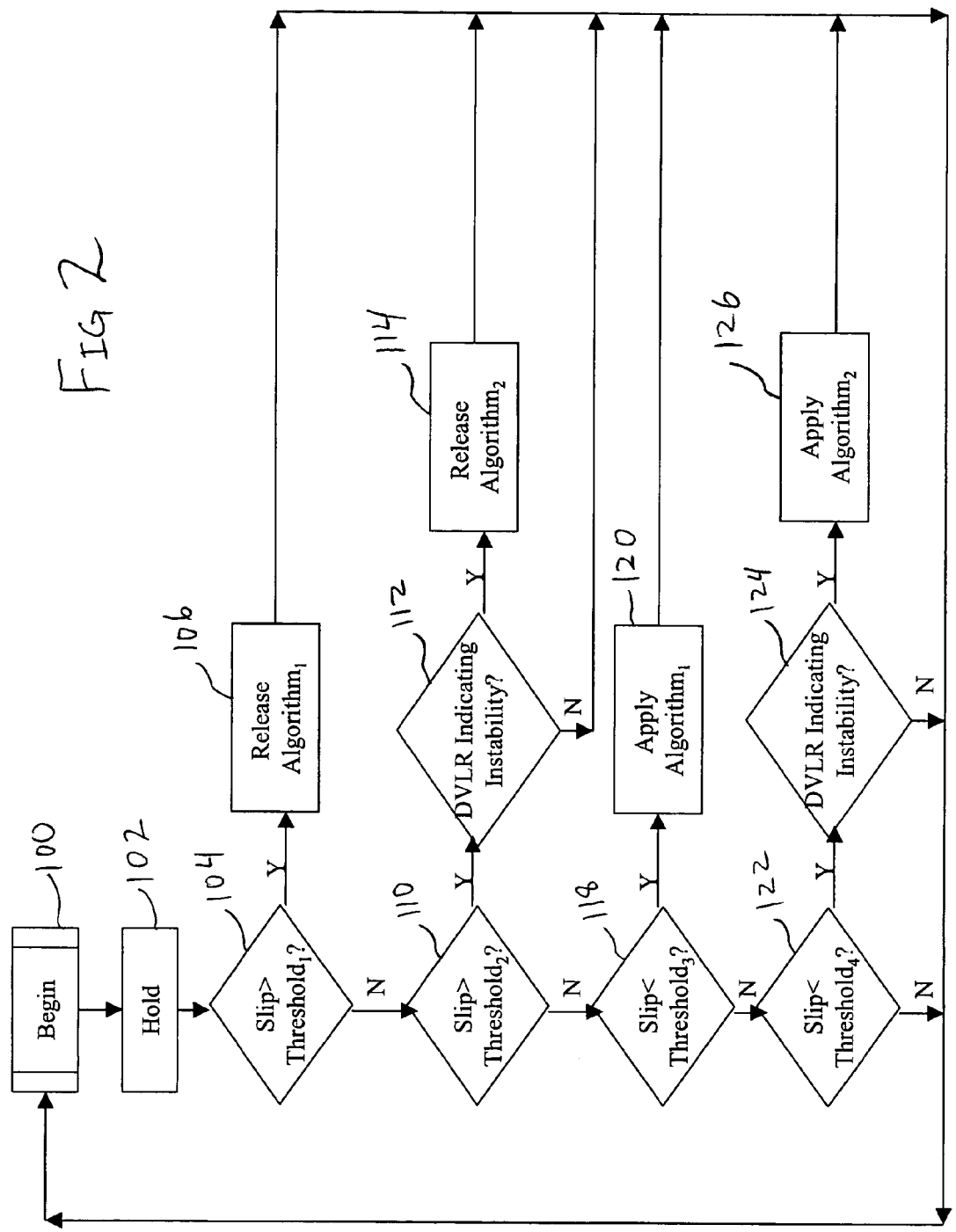
FIG. 2 is a flow chart illustrating one algorithm for implementing the system or method of the present invention.

Once values for slip and DVLR are determined, the system may then enter an algorithm to determine whether brake pressure for the wheel under examination should be modified. As shown at FIG. 2, the system begins at block 100 and at block 102 the brake system enters a "hold" state. The hold state is the default state for this algorithm, and the remaining steps are utilized to determine whether the brakes depart from the hold state (i.e. whether the brakes should be applied or released). In its physical application, if the algorithm of FIG. 2 does in fact determine that the brakes should be applied or released, the application or release will occur very quickly such that the brakes may not necessarily be physically "held" or actually have sufficient time to enter a hold state at block 102. Thus the hold state at block 102 may be provided more as a conceptual default rather than a physical "holding" of the brakes, although due to a relatively quick switch time for valves the brakes may actually be held at step 102.

At block 104 it is examined whether the slip value for the wheel under examination is greater than a first slip threshold (Threshold$_1$). If the slip is determined to be greater than the first slip threshold, then the system proceeds to block 106 and the brake for that wheel is released. The value for the first slip threshold may be set to nearly any value as desired to provide the desired characteristics to the system/method of the present invention, and in one case may be between about 1% and about 20%, and more particularly about 10%.

The release algorithm at block 106 can be implemented in a wide variety of manners. In one case, the brake(s) to the wheel of interest are released for a period of time, and the system then waits for a brief period of time before proceeding. For example, at block 106 the brake may be released for 8 ms and the system may then rest for 32 ms. This rest period allows time for the release of the brake to effect the vehicle before the system loops again to determine whether any further corrective action is required, and if so, what sort of corrective action is required. The system control implemented at blocks 104, 106 may be visualized as a release that is implemented when the wheel slip gets too high. After the system exits block 106 the system returns to block 100 and repeats.

If, at block 104 it is determined that the slip value for the wheel is not greater than the first slip threshold, the system proceeds to block 110. At block 110 it is examined whether the slip value for the wheel under examination is greater than a second slip threshold (Threshold$_2$). Although the second slip threshold may be set at any desired level to provide the appropriate/desired control, in most cases it is expected that the second threshold will be less than the first threshold. In one case the second threshold may be between about 1% and about 20%, and more particularly about 5–7%.

Figure 3:
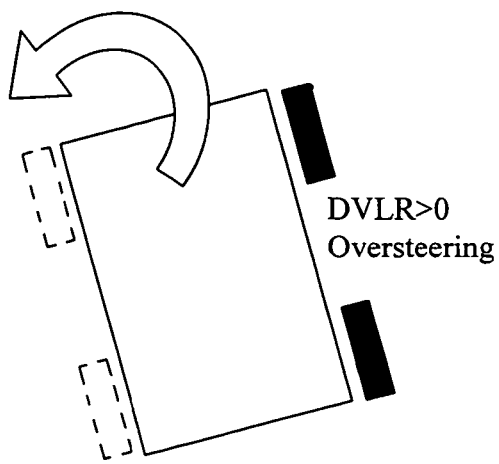
FIGS. 3–6 are schematic representations of a turning vehicle illustrating various oversteer and understeer conditions.

If the slip is determined to be greater than the second slip threshold at block 110, then the system proceeds to block 112 and the instability of the system is examined. One way to determine instability is to examine the magnitude and sign of the DVLR value. Thus, as an example, if the vehicle is in a left turn, the value for DVLR may be compared to a first DVLR threshold to determine whether DVLR is greater than (or less than, depending upon sign conventions) the first DVLR threshold. For example, in a left turn a positive DVLR value may indicate that the speed of the right side of the vehicle should be decreased and/or the speed of the left side of the vehicle should be increased (if possible) in order to increase the stability of the vehicle. Thus, a sufficiently large positive DVLR value during a left turn, when coupled with a sufficiently high slip value, indicates that the brakes on the right side of the vehicle should be applied and the brakes on the left side of the vehicle should be released. This situation is illustrated in FIG. 3, using the convention that the wheels on the right side of the vehicle are solidly shaded (representing application of the brakes to those wheels) and the wheels on the left side of the vehicle are shown in dotted lines (representing release of the brakes to those wheels).

Thus in a left turn a sufficiently large positive DVLR value is indicative of an oversteering condition and when the wheel under consideration is on the left side of the vehicle then the brakes for that wheel may be desired to be released (i.e. the system may proceed to block 114). In a right turn the DVLR value may be a negative value, which may be indicative of understeering. Thus when the value for DVLR is a negative value having a sufficiently high magnitude or absolute value, then the brake for the left wheel may be desired to be released (see FIG. 4).

Thus, at block 112 the following statement or equation may be used for a left wheel to determine whether instability is indicated and whether the system should proceed to the release algorithm:

If ((Left Turn=True) and ($DVLR > DVLR$ Threshold1)) or ((Left Turn=False) and ($DVLR < DVLR$ Threshold2)) (Eq. 4)

Figure 4:
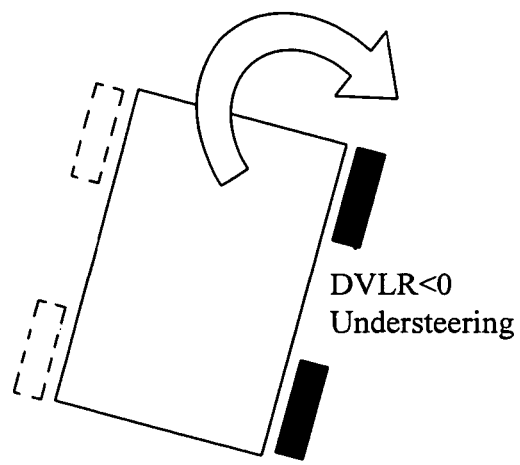

Thus, the first portion of Equation 4 represents the situation illustrated in FIG. 3 and the second portion of Equation 4 represents the situation illustrated in FIG. 4. The values for the DVLR Thresholds may be set to adjust the desired characteristics of the method and system, and may have a wide range of values. In one embodiment, the DVLR Thresholds may have values of between about 2–50 kph, or more particularly, between about 3–7 kph. Thus, if Equation 4 is true the system may proceed to block 114 and to Release Algorithm$_2$. Release Algorithm$_2$ may be the same brake release procedure as Release Algorithm$_1$ or it may be a different release algorithm, depending upon the desired characteristics of the system and method. After the system exits block 114 the system returns to block 100 and repeats.

As noted above, Equation 4 may be utilized for a left wheel. If the wheel under examination is a right wheel, the following equation or statement may be utilized:

If ((Left Turn=True) and ($DVLR < DVLR$ Threshold3)) or ((Left Turn=False) and ($DVLR > DVLR$ Threshold4)) (Eq. 5)

Figure 5:
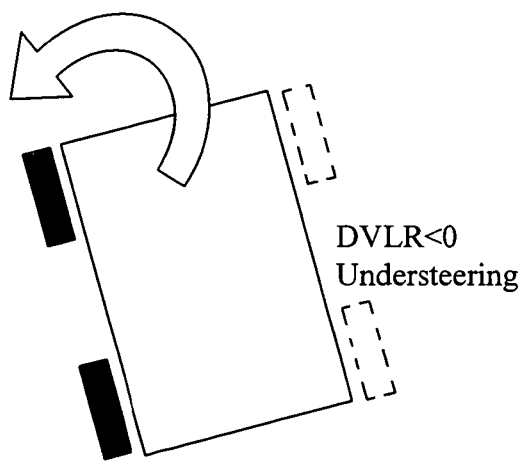
Figure 6:
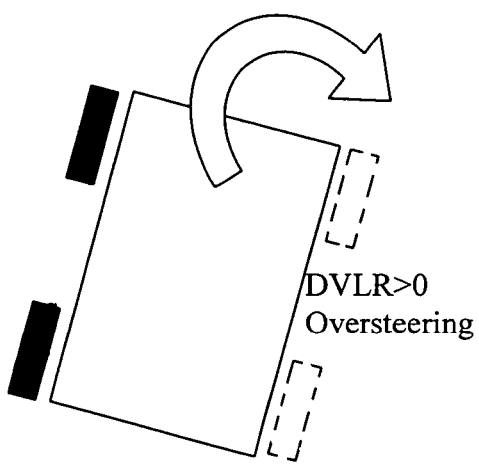

Thus, the first portion of Equation 5 represents the situation illustrated in FIG. 5 and the second portion of Equation 5 represents the situation illustrated in FIG. 6. Of course, Equations 4 and 5 are illustrative of merely one manner in which it can be determined whether it would be advantageous to release the wheel of interest, considering, for example, a DVLR value. Various other methods for determining whether it would be advantageous (i.e. to increase stability or ensure the vehicle attains the desired heading) to release the brake to the wheel of interest may be used without departing from the scope of the invention.

Returning to block 110, if it was determined that the slip was not greater than slip Threhold$_2$, then the system proceeds to block 118 wherein it is examined whether the slip value for the wheel under examination is less than a third slip threshold (Threhold$_3$). If the slip is determined to be less than the third slip threshold, then the system proceeds to block 120 and the brake for that wheel is applied. The value for the third threshold may be set to nearly any limit as desired to provide the desired characteristics to the system/method of the present invention, and in one case may be between about 1% and about 20%, and more particularly about 2–3%.

The apply algorithm at block 120 can be implemented in a wide variety of manners. In one case, the brakes to the wheel of interest are applied for a period of time, and the system then waits for a brief period of time before proceeding. For example, at block 120 the brake may be applied for 5 ms and the system may then rest for 35 ms. This rest period allows time for the application of the brake to effect the vehicle before the system loops again to determine whether any further corrective action is required and if so what sort of corrective action is required. After the system exits block 120 the system returns to block 100 and repeats.

However, before the apply algorithm at block 120 is entered, the system may first implement a check. For example, the desired pressure in the master cylinder 66, as requested or desired by the driver, may be stored and noted, and the system may be monitored to ensure that the pressure in the master cylinder 66 is not increased beyond that requested by the driver. In other words, if the Apply Algorithm of block 120 would increase the pressure in the master cylinder 66 beyond that requested by the driver then block 120 may be bypassed.

Furthermore, if desired, this check step may be omitted. Because the system/method of the present invention may not include or utilize any pumps, any request from the system/method to increase the pressure beyond that in the master cylinder 66 may not have any physical effect since the system/method may lack any structure or means for increasing the pressure in the brake system beyond that in the master cylinder 66.

The system control implemented at blocks 118, 120 may be visualized as an "apply" step that is implemented when the wheel slip gets too low. In other words, blocks 118 and 120 may be visualized as a system to increase braking pressure to ensure the vehicle is decelerated as quickly as possible to match the performance requested by the driver.

If, at block 118, it is determined that the slip value for the wheel under examination is not less than the third slip threshold, the system proceeds to block 122. At block 122 it is examined whether the slip value for the wheel under examination is less than a fourth slip threshold (Threhold$_4$). Although the fourth slip threshold may be set at any desired level to provide the appropriate/desired control, in most cases it is expected that the fourth slip threshold will be greater than the third slip threshold. In one case the fourth threshold may be between about 1% and about 20%, and more particularly about 5–7%.

If at block 122 the slip is determined to be less than the fourth threshold, then the system proceeds to block 124 and the instability of the system is examined. The instability of the vehicle may be examined in a manner similar to that outlined above with respect to block 112, but at block 124 it is considered whether application of a brake to the wheel of interest may increase stability.

Thus, in one case, if the vehicle is in a left turn and the wheel under consideration is the right wheel, the value for DVLR may be compared to a DVLR threshold to determine whether DVLR is greater than (or less than, depending upon sign conventions) the DVLR threshold. For example, as shown in FIG. 3, a sufficiently large DVLR value in a left turn may indicate that the speed of the right side of the vehicle should be decreased in order to increase the stability of the vehicle. Thus, a positive DVLR value may indicate that the brakes on the right side of the vehicle should be applied.

Thus in a left turn a positive DVLR value may be indicative of an oversteering condition. When the value for DVLR is sufficiently large, and the wheel under consideration is on the right side of the vehicle, then the brake(s) for the right wheel may be desired to be applied (i.e. the system may proceed to block 126).

In a right turn a negative DVLR value may be indicative of an understeering condition. Thus when the value for DVLR is a negative value having a sufficiently high magnitude or absolute value, then the brake(s) for the right wheel may be desired to be applied, as shown in FIG. 4.

Thus, at block 124 the following statement or equation may be used for a right wheel to determine whether instability is indicated and whether the system should proceed to an apply algorithm:

If ((Left Turn=True) and (*DVLR*>*DVLR* Threshold5)) or ((Left Turn=False) and (*DVLR*<*DVLR* Threshold6))     (Eq. 6)

Thus, the first portion of Equation 6 represents the situation illustrated in FIG. 3 and the second portion of Equation 6 represents the situation illustrated in FIG. 4. The values for the DVLR Thresholds of Equation 6 may be set to adjust the desired characteristics of the method and system, and may have a wide range of values. In one embodiment, the DVLR Thresholds 5 and 6 may have values of between about 2–50 kph, or more particularly, between about 3–7 kph. Equation 6 has the same general form as Equation 4, although the values for the DVLR thresholds may differ, if desired. Thus, if Equation 6 is true the system may proceed to block 126 and to Apply Algorithm$_2$.

Apply Algorithm$_2$ may be the same brake apply procedure as Apply Algorithm$_1$ or it may be a different apply algorithm, depending upon the desired characteristics of the system and method. Furthermore, the same checks outlined above to ensure that the applied pressure does not exceed the pressure in the master cylinder may be utilized before the system proceeds to the Apply Algorithm of block 126.

As noted above, Equation 6 may be utilized for a right wheel. If the wheel under examination is a left wheel, the following equation or statement may be utilized:

If ((Left Turn=True) and (*DVLR*<*DVLR* Threshold7)) or ((Left Turn=False) and (*DVLR*>*DVLR* Threshold8))     (Eq. 7)

Thus, the first portion of Equation 7 represents the situation illustrated in FIG. 5 and the second portion of Equation 7 represents the situation illustrated in FIG. 6. Equation 7 has the same form as Equation 5, although the values for the DVLR thresholds may differ, if desired. Of course, Equations 6 and 7 are illustrative of merely one manner in which it can be determined whether it would be advantageous to apply the brake(s) to the wheel of interest, considering, for example, the DVLR value. Various other methods for determining whether it would be advantageous (i.e. by increasing stability or ensuring the vehicle attains the desired heading) to apply the brake to the wheel of interest may be used without departing from the scope of the invention. After the system exits either block 122 or block 126 the system returns to block 100 and repeats.

The system may be implemented upon all four wheel 12, 14, 16, 18 of a vehicle 10 simultaneously or upon each of the wheels in sequential order. Thus, for example, the flow chart of FIG. 2 may be utilized in series for all four wheels, or may be utilized simultaneously (i.e. in parallel) for each wheel. Further, the system may be implemented in a vehicle having more or less than four wheels. The system and method increases stability of the vehicle and performance of the vehicle, and does not require pumps or boosters in the brake system. Individual control can be exerted over each of the four wheels to provide more accurate control.

Further, each of the thresholds discussed herein (for example, slip threshold$_1$, slip threshold$_2$, slip threshold$_3$, slip threshold$_4$, DVLR thresholds 1–8, etc.) may not necessarily be fixed values, but may be dynamic or variable thresholds which can be set on the fly to change the operating characteristics of the system or method. The various thresholds may be set by taking into account a wide variety of factors, such as wheel slip, applied brake pressure, DVLR, etc. Furthermore, each threshold may be set or calculated independently for each wheel under examination. Finally, the closed-loop control system and method of the present invention provides continuous monitoring and feedback during a turn.

Having described the invention in detail and by reference to the preferred embodiments, it will be apparent that modifications and variations thereof are possible without departing from the scope of the invention.

What is claimed is:

1. A control system for controlling a brake system of a braked vehicle during a turn, said vehicle having four wheels, said control system being configured to selectively modify a brake pressure applied to each of said wheels by said brake system, said control system being configured to receive a driver input relating to a brake pressure sought to be applied, said control system comprising a controller for monitoring a slip status of each of said four wheels during a turn and wherein said controller is configured to direct said brake system to independently increase, decrease, or hold the brake pressure applied to each of said four wheels based at least in part upon slip status of each respective wheel and wherein said controller is configured to direct said brake system to increase, decrease or hold said brake pressure applied to each of said wheels such that the brake pressure applied to a given wheel of said four wheels is always equal to or less than said brake pressure sought to be applied.

2. The system of claim 1 wherein said slip status of each wheel is related to the difference between a speed of each wheel and an adjusted speed of said vehicle.

3. The system of claim 2 wherein said slip status of each wheel is represented by the associated difference divided by the adjusted speed of said vehicle.

4. The system of claim 2 wherein said adjusted speed of said vehicle incorporates the speed of said vehicle at a center of gravity of said vehicle.

5. The system of claim 2 wherein said adjusted speed of said vehicle incorporates the speed of said vehicle at a center of gravity of said vehicle and a yaw velocity component of said vehicle.

6. The system of claim 5 wherein said controller is configured to determine a corrective differential velocity which represents a velocity difference between at least one wheel on one side of said vehicle and at least another wheel on another side of said vehicle that is desired to maintain the desired heading of said vehicle, and wherein said adjusted speed of said vehicle incorporates said corrective differential velocity.

7. The system of claim 1 wherein said controller is configured to determine a corrective differential velocity which represents a velocity difference between at least one wheel on one side of said vehicle and at least another wheel on another side of said vehicle that is desired to maintain the desired heading of said vehicle, and wherein said controller is configured to independently direct said brake system to increase, decrease, or hold the brake pressure applied to each of said four wheels based at least in part upon said corrective differential velocity.

8. The system of claim 1 wherein said controller is configured to direct said brake system to decrease brake pressure to a wheel when the slip status for that wheel exceeds a first slip value.

9. The system of claim 8 wherein said controller is configured to determine a corrective differential velocity which represents a velocity difference between at least one wheel on one side of said vehicle and at least another wheel on another side of said vehicle that is desired to maintain the desired heading of said vehicle, and wherein said controller is configured to direct said brake system to decrease brake pressure to a wheel when the slip for that wheel exceed a second slip value and when such a decrease would improve the stability of the vehicle based upon an examination of said corrective differential velocity.

10. The system of claim 9 wherein said controller is configured to determine whether a decrease would improve the stability of the vehicle based upon an examination of said corrective differential velocity by comparing the magnitude of the corrective differential velocity to a differential velocity threshold.

11. The system of claim 10 wherein said comparison includes consideration of the direction of the turn.

12. The system of claim 9 wherein said first slip value is greater than said second slip value.

13. The system of claim 1 wherein said controller is configured to direct said brake system to increase brake pressure to a wheel when the slip status for that wheel is less than a third slip value.

14. The system of claim 13 wherein said controller is configured to determine a corrective differential velocity which represents a velocity differential between at least one wheel on one side of said vehicle and at least another wheel on another side of said vehicle that is desired to maintain the desired heading of said vehicle, and wherein said controller is configured to direct said brake system to increase brake pressure to a wheel when the slip for that wheel exceed a fourth slip value and when such an increase would improve the stability of the vehicle based upon an examination of said corrective differential velocity.

15. The system of claim 14 wherein said controller is configured to determine that a increase would improve the stability of the vehicle based upon an examination of said corrective differential velocity by comparing the magnitude of the corrective differential velocity to a differential velocity threshold.

16. The system of claim 15 wherein said comparison includes consideration of the direction of the turn.

17. The system of claim 14 wherein said third slip value is less than said fourth slip value.

18. The system of claim 1 wherein said controller is configured to direct said brake system to increase brake pressure to one of said wheels only when the pressure in the brake associated with said one of said wheels is less than the pressure in a master cylinder of the brake system.

19. The system of claim 1 wherein said system further includes a vehicle having a plurality of wheels and a plurality of brake subsystems, each brake subsystem being associated with one of said wheels to apply a brake pressure to the associated wheel, and wherein said controller is operatively coupled to each brake subsystem.

20. The system of claim 1 wherein said controller is arranged in a closed-loop configuration such that said controller generally continuously repeats said monitoring and said increasing, decreasing or holding.

21. The control system of claim 1 further including a master cylinder and a brake pedal operatively coupled to said master cylinder such that when a driver depresses said brake pedal said brake pressure sought to be applied is created in said master cylinder, and wherein said control system is configured such that said control system cannot modify a brake pressure applied to any of said wheels in a manner such that the brake pressure applied to that wheel is higher than said pressure in said master cylinder.

22. The control system of claim 1 wherein said brake pressure sought to be applied is directly related to a driver input via a brake pedal.

23. A control system for controlling a brake system of a braked vehicle during a turn, said vehicle having a plurality of wheels, said control system being configured to selectively modify a brake pressure applied to each of said wheels by said brake system, said control system being configured to receive a driver input relating to a brake pressure sought to be applied, said control system comprising a controller for determining a corrective differential velocity which represents a velocity differential between at least one wheel on one side of said vehicle and at least another wheel on another side of said vehicle that is desired to maintain the desired heading of said vehicle, and wherein said controller is configured to direct said brake system to increase, decrease, or hold the brake pressure applied to each of said wheels based at least in part upon said corrective differential velocity and wherein said controller is configured to direct said brake system to increase, decrease, or hold said brake pressure sought to be applied to each of said wheels such that the brake pressure applied to a given wheel of said plurality of wheels is always equal to or less than said brake pressure sought to be applied.

24. The system of claim 23 wherein said vehicle has four wheels and wherein said controller is configured to direct said brake system to independently increase, decrease, or hold the brake pressure applied to each of said four wheels.

25. The system of claim 24 wherein said controller is configured to direct said brake system to independently increase, decrease, or hold the brake pressure applied to each of said four wheels based at least in part upon slip status of each respective wheel.

26. The system of claim 25 wherein said slip status of each wheel is related to the difference between a speed of each wheel and an adjusted speed of said vehicle.

27. The system of claim 26 wherein said adjusted speed of said vehicle incorporates the speed of said vehicle at a center of gravity of said vehicle.

28. The system of claim 21 wherein said controller is configured to direct said brake system to decrease brake pressure to a wheel when the slip status for that wheel exceeds a first slip value.

29. The system of claim 23 wherein said controller is configured to direct said brake system to increase brake pressure to a wheel when the slip status for that wheel is less than a second slip value.

30. The system of claim 23 wherein said system further includes a vehicle having a plurality of wheels and a plurality of brake subsystems, each brake subsystem being associated with one of said wheels to apply a brake pressure to the associated wheel, and wherein said controller is operatively coupled to each brake subsystem.

31. The system of claim 23 wherein said controller is arranged in a closed-loop configuration such that said controller generally continuously repeats said monitoring and said increasing, decreasing or holding.

32. The control system of claim 23 wherein said controller is configured to direct said brake system to increase brake pressure to one of said wheels only when the pressure in the brake of interest is less than the pressure in a master cylinder of the brake system.

33. The control system of claim 23 further including a master cylinder and a brake pedal operatively coupled to said master cylinder such that when a driver depresses said brake pedal said brake pressure sought to be applied is created in said master cylinder, and wherein said control system is configured such that said control system cannot modify a brake pressure applied to any of said wheels in a manner such that the brake pressure applied to that wheel is higher than said pressure in said master cylinder.

34. The control system of claim 23 wherein said brake pressure sought to be applied is directly related to a driver input via a brake pedal.

35. A method for controlling a brake system of a vehicle during a turn, said vehicle having four wheels, the method comprising:
receiving a driver input relating to a brake pressure sought to be applied to each of said wheels;
monitoring a slip status of each of said four wheels during a turn; and
independently increasing, decreasing, or holding the brake pressure applied to each of said four wheels based at least in part upon slip status of each respective wheel such that said brake pressure applied to a given wheel of said four wheels is always equal to or less than said brake pressure sought to be applied.

36. The method of claim 35 wherein said vehicle further includes a master cylinder and a brake pedal operatively coupled to said master cylinder such that when a driver depresses said brake pedal said brake pressure sought to be applied is created in said master cylinder, and wherein said increasing, decreasing or holding step is carried out such that said the brake pressure applied to any of said wheels is never higher than said pressure in said master cylinder.

37. A method for controlling a brake system of a vehicle during a turn, said vehicle having a plurality of wheels, the method comprising:
receiving a driver input relating to a brake pressure sought to be applied to each of said wheels;
determining a corrective differential velocity which represents a velocity differential between at least one wheel on one side of said vehicle and at least another wheel on another side of said vehicle that is desired to maintain a desired heading of said vehicle; and
increasing, decreasing, or holding the brake pressure applied to each of said wheels based at least in part upon said determined corrective differential velocity such that the brake pressure applied to a given wheel of said plurality of wheels is always equal to or less than said brake pressure sought to be applied.

38. The method of claim 37 wherein said vehicle further includes a master cylinder and a brake pedal operatively coupled to said master cylinder such that when a driver depresses said brake pedal said brake pressure sought to be applied is created in said master cylinder, and wherein said increasing, decreasing or holding step is carried out such that said the brake pressure applied to any of said wheels is never higher than said pressure in said master cylinder.

* * * * *